US006487912B1

(12) United States Patent
Behm et al.

(10) Patent No.: US 6,487,912 B1
(45) Date of Patent: Dec. 3, 2002

(54) PREINSTALLATION OF A PRESSURE SENSOR MODULE

(75) Inventors: Steven M. Behm, White Bear Lake, MN (US); Richard L. Nelson, Chanhassen, MN (US); Robert Hedtke, Young America, MN (US); Roger Frick, Hackensack, MN (US); Scott D. Nelson, Plymouth, MN (US); Mark Fandrey, Eden Prairie, MN (US); Theodore H. Schnaare, Chaska, MN (US); Brian L. Westfield, Victoria, MN (US); Mark S. Schumacher, Minneapolis, MN (US); Weston Roper, St. Louis Park, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/519,912

(22) Filed: Mar. 7, 2000

Related U.S. Application Data (60) Provisional application No. 60/156,369, filed on Sep. 28, 1999.

(51) Int. Cl.[7] .................................................. G01L 9/00
(52) U.S. Cl. ........................................................ 73/753
(58) Field of Search .......................... 73/753, 706, 715, 73/756; 361/283

(56) References Cited

U.S. PATENT DOCUMENTS

| 3,701,280 A | 10/1972 | Stroman ...................... 73/194 |
| 3,968,694 A | 7/1976 | Clark .......................... 73/398 |
| 4,120,206 A | 10/1978 | Rud, Jr. ....................... 73/718 |
| 4,125,027 A | 11/1978 | Clark .......................... 73/724 |
| 4,238,825 A | 12/1980 | Geery ........................ 364/510 |
| 4,250,490 A | 2/1981 | Dahlke ................... 340/870.37 |
| 4,287,501 A | 9/1981 | Tominaga et al. ............ 338/42 |
| 4,414,634 A | 11/1983 | Louis et al. ................. 364/510 |
| 4,419,898 A | 12/1983 | Zanker et al. ............ 73/861.02 |
| 4,446,730 A | 5/1984 | Smith .......................... 73/301 |
| 4,455,875 A | 6/1984 | Guimard et al. .............. 73/708 |
| 4,485,673 A | 12/1984 | Stern ........................... 73/304 |
| 4,528,855 A | 7/1985 | Singh .......................... 73/721 |
| 4,562,744 A | 1/1986 | Hall et al. ................ 73/861.02 |
| 4,598,381 A | 7/1986 | Cucci ......................... 364/558 |
| 4,602,344 A | 7/1986 | Ferretti et al. .............. 364/509 |

(List continued on next page.)

FOREIGN PATENT DOCUMENTS

| DE | 37 41 648 A1 | 7/1988 |
| DE | 91 09 176.4 | 10/1991 |
| DE | 197 45 244 A1 | 4/1998 |

(List continued on next page.)

OTHER PUBLICATIONS

International Search Report from the European Patent Office for International Application No. PCT/US 01/14521 filed May 4, 2001.

(List continued on next page.)

Primary Examiner—William Oen
(74) Attorney, Agent, or Firm—Westman, Champlin & Kelly, P.A.

(57) ABSTRACT

A pressure sensor module and method for pre-installation without a converter module. The pressure sensor module is hermetically sealed and can remain undamaged in an installation environment without a converter module. The pressure sensor module can be assembled later with a converter module in the installation environment. The pressure sensor module includes an isolator, a pressure sensor and a circuit that provides a bus for energization, control and a digital pressure output. The bus is connected to contacts in an insulating feedthrough. An integrally formed hermetic external support structure surrounds the pressure sensor and circuit. The hermetic external support structure has a threaded process fluid inlet around the isolator, and a threaded support sleeve supporting the feedthrough.

20 Claims, 5 Drawing Sheets

U.S. PATENT DOCUMENTS

| | | | |
|---|---|---|---|
| 4,617,607 A | 10/1986 | Park et al. | 361/283 |
| D287,827 S | 1/1987 | Broden | D10/46 |
| 4,644,797 A | 2/1987 | Ichikawa et al. | 73/706 |
| 4,653,330 A | 3/1987 | Hedtke | 73/756 |
| 4,677,841 A | 7/1987 | Kennedy | 73/30 |
| 4,745,810 A | 5/1988 | Pierce et al. | 73/706 |
| D296,995 S | 8/1988 | Lee | D10/46 |
| D297,314 S | 8/1988 | Hedtke | D10/46 |
| D297,315 S | 8/1988 | Pierce et al. | D10/85 |
| 4,783,659 A | 11/1988 | Frick | 340/870.37 |
| 4,798,089 A | 1/1989 | Frick et al. | 73/706 |
| 4,818,994 A | 4/1989 | Orth et al. | 340/870.21 |
| 4,825,704 A | 5/1989 | Aoshima et al. | 73/861.42 |
| 4,833,922 A | 5/1989 | Frick et al. | 73/756 |
| 4,850,227 A | 7/1989 | Luettgen et al. | 73/708 |
| 4,866,989 A | 9/1989 | Lawless | 73/756 |
| 4,881,412 A | 11/1989 | Northedge | 73/861.04 |
| 4,930,353 A | 6/1990 | Kato et al. | 73/727 |
| 4,958,938 A | 9/1990 | Schwartz et al. | 374/208 |
| 4,970,898 A | 11/1990 | Walish et al. | 73/706 |
| 4,980,675 A | 12/1990 | Meisenheimer, Jr. | 340/626 |
| 5,000,047 A | 3/1991 | Kato et al. | 73/706 |
| D317,266 S | 6/1991 | Broden et al. | D10/46 |
| D317,269 S | 6/1991 | Selg | D10/52 |
| D318,432 S | 7/1991 | Broden et al. | D10/46 |
| 5,028,746 A | 7/1991 | Petrich | 191/12.2 R |
| 5,035,140 A | 7/1991 | Daniels et al. | 73/290 |
| 5,051,937 A | 9/1991 | Kawate et al. | 364/571.01 |
| 5,058,437 A | 10/1991 | Chaumont et al. | 73/861.21 |
| 5,060,108 A * | 10/1991 | Baker et al. | 361/283 |
| 5,070,732 A | 12/1991 | Duncan et al. | 73/431 |
| 5,083,091 A | 1/1992 | Frick et al. | 324/678 |
| 5,087,871 A | 2/1992 | Losel | 323/299 |
| 5,094,109 A | 3/1992 | Dean et al. | 73/718 |
| D329,619 S | 9/1992 | Cartwright | D10/52 |
| 5,142,914 A | 9/1992 | Kusakabe et al. | 73/723 |
| 5,157,972 A | 10/1992 | Broden et al. | 73/718 |
| 5,162,725 A | 11/1992 | Hodson et al. | 324/115 |
| 5,187,474 A | 2/1993 | Kielb et al. | 340/870.18 |
| 5,212,645 A | 5/1993 | Wildes et al. | 364/463 |
| 5,227,782 A | 7/1993 | Nelson | 340/870.11 |
| 5,236,202 A | 8/1993 | Krouth et al. | 277/164 |
| 5,245,333 A | 9/1993 | Anderson et al. | 340/870.3 |
| 5,248,167 A | 9/1993 | Petrich et al. | 285/23 |
| D342,456 S | 12/1993 | Miller et al. | D10/60 |
| 5,276,631 A | 1/1994 | Popovic et al. | 364/571.04 |
| 5,287,746 A | 2/1994 | Broden | 73/706 |
| 5,353,200 A | 10/1994 | Bodin et al. | 361/816 |
| 5,369,386 A | 11/1994 | Alden et al. | 335/206 |
| 5,377,547 A | 1/1995 | Kusakabe et al. | 73/723 |
| 5,381,355 A | 1/1995 | Birangi et al. | 364/724.01 |
| D358,784 S | 5/1995 | Templin, Jr. et al. | D10/96 |
| 5,436,824 A | 7/1995 | Royner et al. | 363/89 |
| 5,448,180 A | 9/1995 | Kienzler et al. | 326/15 |
| 5,469,150 A | 11/1995 | Sitte | 340/825.07 |
| 5,471,885 A | 12/1995 | Wagner | 73/862.041 |
| D366,000 S | 1/1996 | Karas et al. | D10/60 |
| D366,218 S | 1/1996 | Price et al. | D10/52 |
| 5,495,768 A | 3/1996 | Louwagie et al. | 73/706 |
| 5,498,079 A | 3/1996 | Price | 374/208 |
| 5,502,659 A | 3/1996 | Braster et al. | 364/571.01 |
| 5,524,333 A | 6/1996 | Hogue et al. | 29/593 |
| 5,524,492 A | 6/1996 | Frick et al. | 73/706 |
| 5,546,804 A | 8/1996 | Johnson et al. | 73/431 |
| 5,600,782 A | 2/1997 | Thomson | 395/182.02 |
| 5,606,513 A | 2/1997 | Louwagie et al. | 364/510 |
| 5,650,936 A | 7/1997 | Loucks et al. | 364/483 |
| 5,656,782 A | 8/1997 | Powell, II et al. | 73/756 |
| 5,665,899 A | 9/1997 | Willcox | 73/1.63 |
| 5,668,322 A | 9/1997 | Broden | 73/756 |
| 5,669,713 A | 9/1997 | Schwartz et al. | 364/557 |
| 5,670,722 A | 9/1997 | Moser et al. | 73/756 |
| 5,677,476 A | 10/1997 | McCarthy et al. | 73/29.01 |
| 5,710,552 A | 1/1998 | McCoy et al. | 340/870.21 |
| 5,754,596 A | 5/1998 | Bischoff et al. | 375/295 |
| 5,764,928 A | 6/1998 | Lancott | 395/285 |
| 5,823,228 A | 10/1998 | Chou | 137/597 |
| 5,870,695 A | 2/1999 | Brown et al. | 702/138 |
| 5,899,962 A * | 5/1999 | Louwagle et al. | 702/138 |
| 5,920,016 A | 7/1999 | Broden | 73/756 |
| 5,948,988 A | 9/1999 | Bodin | 73/706 |
| 5,954,526 A | 9/1999 | Smith | 439/136 |
| 5,955,684 A | 9/1999 | Gravel et al. | 73/866.5 |
| 5,973,942 A | 10/1999 | Nelson et al. | 363/21 |
| 5,988,203 A | 11/1999 | Hutton | 137/597 |
| 6,005,500 A | 12/1999 | Gaboury et al. | 341/43 |
| 6,006,338 A | 12/1999 | Longsdorf et al. | 713/340 |
| 6,038,927 A | 3/2000 | Karas | 73/706 |
| 6,050,145 A | 4/2000 | Olson et al. | 73/706 |
| 6,059,254 A | 5/2000 | Sundet et al. | 248/678 |
| 6,105,437 A | 8/2000 | Klug et al. | 73/756 |
| 6,111,888 A | 8/2000 | Green et al. | 370/461 |
| 6,115,831 A | 9/2000 | Hanf et al. | 714/43 |
| 6,123,585 A | 9/2000 | Hussong et al. | 439/652 |
| 6,131,467 A | 10/2000 | Miyano et al. | 73/756 |
| 6,140,952 A | 10/2000 | Gaboury | 341/143 |
| 6,151,557 A | 11/2000 | Broden et al. | 702/47 |
| 6,216,172 B1 | 4/2001 | Koblin et al. | 709/253 |
| 6,233,532 B1 | 5/2001 | Boudreau et al. | 702/89 |
| 6,285,964 B1 | 9/2001 | Babel et al. | 702/121 |
| 6,295,875 B1 | 10/2001 | Frick et al. | 73/718 |
| 6,311,568 B1 | 11/2001 | Kleven | 73/861.42 |
| 6,321,166 B1 | 11/2001 | Evans et al. | 702/50 |

FOREIGN PATENT DOCUMENTS

| | | |
|---|---|---|
| DE | 299 03 260 U1 | 5/2000 |
| EP | 0 063 685 A1 | 11/1982 |
| EP | 0 167 941 A2 | 6/1985 |
| EP | 0 214 801 A1 | 3/1987 |
| EP | 0 223 300 A2 | 5/1987 |
| EP | 0 268 742 A1 | 7/1987 |
| EP | 639039 A1 | 2/1995 |
| EP | 0 903 651 A1 | 3/1999 |
| JP | 2000121470 | 10/1998 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |
| WO | WO 96/34264 | 10/1996 |
| WO | WO 98/48489 | 10/1998 |
| WO | WO 00/23776 | 4/2000 |

OTHER PUBLICATIONS

U.S. patent application Ser. No. 09/862,762, May 21, 2001, Wang.

U.S. patent application Ser. No. 09/867,961, May 30, 2001, Fandrey et al.

"Notification of Transmittal of the International Search Report or the Declaration" PCT/US01/13993.

"Notification of Transmittal of the International Search Report or the Declaration" of Internatinal Application No. PCT/US00/26563.

U.S. patent application Ser. No. 09/671,495, Sep. 27, 2000, Behm et al.

U.S. patent application Ser. No. 09/519,781, Mar. 7, 2000, Nelson et al.

U.S. patent application Ser. No. 09/520,292, Mar. 7, 2000, Davis et al.

U.S. patent application Ser. No. 09/672,338, Sep. 28, 2000, Nelson et al.
U.S. patent application Ser. No. 09/638,181, Jul. 31, 2000, Roper et al.
U.S. patent application Ser. No. 09/571,111, May 15, 2000, Westfield et al.
U.S. patent application Ser. No. 09/564,506, May 4, 2000, Nord et al.
U.S. patent application Ser. No. 09/667,289, Sep. 22, 2000, Westfield et al.
U.S. patent application Ser. No. 09/667,399, Sep. 21, 2000, Behm et al.
U.S. patent application Ser. No. 09/671,130, Sep. 27, 2000, Fandrey et al.
U.S. patent application Ser. No. 29/120,531, Mar. 21, 2000, Fandrey et al.
U.S. patent application Ser. No. 29/120,544, Mar. 21, 2000, Fandrey et al.
U.S. patent application Ser. No. 29/120,538, Mar. 21, 2000, Fandrey et al.
U.S. patent application Ser. No. 29/120,552, Mar. 21, 2000, Fandrey et al.
U.S. patent application Ser. No. 29/120,537, Mar. 21, 2000, Fandrey et al.
U.S. patent application Ser. No. 29/120,553, Mar. 21, 2000, Fandrey et al.
Product Data Sheet No: 00813–0100–4378, "Model 751 Field Signal Indicator", by Rosemount Inc., Eden Prairie, Minnesota, (1997).
Product Data Sheet No: 00813–0100–4731, "APEX™ Radar Gauge", by Rosemount Inc., Eden Prairie, Minnesota, (1998).
Product Data Sheet No: 00813–0100–4640, "Model 3201 Hydrostatic Interface Unit", from the Rosemount Comprehensive Product Catalog, published 1998, by Rosemount Inc., Eden Prairie, Minnesota.
Product Data Sheet No: 00813–0100–4003, "Model 8800A", by Rosemount Inc., Eden Prairie, Minnesota, (1998).
Product Data Sheet No: 00813–0100–4773, "Model 8742C—Magnetic Flowmeter Transmitter with FOUNDATION™ Fieldbus", from the Rosemount Comprehensive Product Catalog, published 1998, by Rosemount Inc., Eden Prairie, Minnesota.
"Rosemount Model 8732C Magnetic Flowmeter Transmitter", by Rosemount Inc., Eden Prairie, Minnesota, (1998).
Product Data Sheet No: 00813–0100–4263, "Model 444 Alphaline© Temperature Transmitters", by Rosemount Inc., Eden Prairie, Minnesota, (1997).
Product Data Sheet No: 00813–0100–4769, "Model 3244MV Multivariable Temperature Transmitter with FOUNDATION™ Fieldbus", by Rosemount Inc., Eden Prairie, Minnesota, (1998).
Product Data Sheet No: 00813–0100–4724, "Models 3144 and 3244MV Smart Temperature Transmitters", by Rosemount Inc., Eden Prairie, Minnesota, (1998).
Product Data Sheet No: 00813–0100–4738, "Model 3095FB Multivariable™ Transmitter with Modbus™ Protocol", by Rosemount Inc., Eden Prairie, Minnesota, (1996, 1997).
Product Data Sheet No: 00813–0100–4001, "Model 3051 Digital Pressure Transmitter for Pressure, Flow, and Level Measurement", by Rosemount Inc., Eden Prairie, Minnesota, (1998).
Product Data Sheet No: 00813–0100–4698, "Model 2090F Sanitary Pressure Transmitter", by Rosemount Inc., Eden Prairie, Minnesota, (1998).
Product Data Sheet No: 00813–0100–4690, "Model 2088 Economical Smart Pressure Transmitter", by Rosemount Inc., Eden Prairie, Minnesota, (1998).
Product Data Sheet No: 00813–0100–4592, "Model 2024 Differential Pressure Transmitter", by Rosemount Inc., Eden Prairie, Minnesota, (1987–1995).
Product Data Sheet No: 00813–0100–4360, "Model 1151 Alphaline© Pressure Transmitters", by Rosemount Inc., Eden Prairie, Minnesota, (1998).
Product Data Sheet No: 00813–0100–4458, "Model 1135F Pressure–to–Current Converter", by Rosemount Inc., Eden Prairie, Minnesota, (1983, 1986, 1994).
"Single Chip Senses Pressure and Temperature," *Machine Design,* 64 (1992) May 21, No. 10.
Brochure: "Reduce Unaccounted–For Natural Gas with High–Accuracy Pressure Transmitters," Rosemount Inc. Measurement Division, Eden Prairie, Minnesota, ADS 3073, May 1991, pp. 1–4.
Technical Information Bulletin, "Liquid Level Transmitter Model DB40RL Sanitary Sensor deltapilot," Endress+Hauser, Greenwood, Indiana, Sep. 1992, pp. 1–8.
"The Digitisation of Field Instruments" W. Van Der Bijl, *Journal A,* vol. 32, No. 3, 1991, pp. 62–65.
Specification Summary, "TELETRANS™ 3508–30A Smart Differential Pressure Transmitter," (Undated) Bristol Babcock, Inc., Watertown, CT, 06795.
Specification Summary, "TELETRANS™ 3508–10A Smart Pressure Transmitter," (undated) Bristol Babcock, Inc., Watertown, CT, 06795.
Specification Summary, "AccuRate Advanced Gas Flow Computer, Model GFC 3308," (undated) Bristol Babcock, Inc., Watertown, CT 06795.
Product Data Sheet PDS 4640, "Model 3201 Hydrostatic Interface Unit," Mar. 1992, Rosemount Inc., Eden Prairie, MN 55344.
Product Data Sheet PDS 4638, "Model 3001CL Flush–Mount Hydrostatic Pressure Transmitter," Jul. 1992, Rosemount Inc., Eden Prairie, MN 55344.
"Flow Measurement," *Handbook of Fluid Dynamics,* V. Streeter, Editor–in–chief, published by McGraw–Hill Book Company, Inc. 1961, pp. 14–4 to 14–15.
"Precise Computerized In–Line Compressible Flow Metering," *Flow—Its Measurement and Control in Science and Industry,* vol. 1, Part 2, Edited by R. Wendt, Jr., Published by American Institute of Physics et al, (undated) pp. 539–540.
"A Systems Approach," Dr. C. Ikoku, *Natural Gas Engineering,* PennWell Books, (undated) pp. 256–257.
"Methods for Volume Measurement Using Tank–Gauging Devices Can Be Error Prone," F. Berto, *The Advantages of Hydrostatic Tank Gauging Systems,* undated reprint from *Oil & Gas Journal.*
"Hydrostatic Tank Gauging—Technology Whose Time Has Come" J. Berto, *Rosemount Measurement Division Product Feature,* undated reprint from *INTECH.*
"Pressure Sensors Gauge Tank Level and Fluid Density," *Rosemount Measurement Division Product Feature,* undated reprint from *Prepared Foods* (Copyrighted 1991 by Gorman Publishing Company).
"Low Cost Electronic Flow Measurement System," *Tech Profile,* May 1993, Gas Research Institute, Chicago, IL.

"Development of an Integrated EFM Device for Orifice Meter Custody Transfer Applications," S.D. Nieberle et al., *American Gas Association Distribution/Transmission Conference & Exhibit*, May 19, 1993.

Advertisement, AccuRate Model 3308 Integral Smart DP/P/T Transmitter, (undated) Bristol Babcock, Inc., Watertown, CT 06795.

Advertisement, Model 3508 DP Transmitter, *Control Engineering*, Dec. 1992, Bristol Babcock, Inc., Watertown, CT 06795.

"Smart Transmitters Tear Up The Market," C. Polsonetti, *INTECH*, Jul. 1993, pp. 42–45.

American National Standard, "Hydraulic Fluid Power–Solenoid Piloted Industrial Valves–Interface Dimensions for Electrical Connectors", National Fluid Power Associatoin, Inc., 10 pages, (Aug. 1981).

2 pages downloaded from http://ww.interlinkbt.com/PRODUCT/IBT_PROD/DN/CN–DM_PN/EURO–DP–HTM dated Sep. 15, 2000.

4 pages downloaded from http://ww.interlinkbt.com/PRODUCT/IBT_PROD/dn/EUR–CON/euro–fwc.htm dated Sep. 15, 2000.

3 pages from TURK Cable Standards, by Turk, Inc., Minneapolis, Minnesota.

"Notification of Transmittal of the International Search Report or the Declaration" for International Application No. PCT/US00/26488.

"Notificiatio of Transmittal of the International Search Report or the Declaration" for International Application No. PCT/US00/26561.

"MicroLAN Design Guide", Dallas Semiconductor, Tech Brief No. 1, (undated).

"Bosch CAN Specification Version 2.0", by Robert Bosch GmbH, pp. 1–68 including pp. –1–and –2–, (Sep. 1991).

Product Data Sheet No. 00813–0100–4360, "Model 1151 Alphaline© Presure Transmitters", by Rosemount Inc., (1997).

Product Data Sheet No. 00813–0100–4001, "Digital Pressure Transmitters for Pressure, Flow, and Level Measurement", by Rosemount Inc., (1998).

"Claudius Ptolemy (100?–170?AD)", *M&C News*, 7 pages, (Apr. 1994).

* cited by examiner

PREINSTALLATION OF A PRESSURE SENSOR MODULE

REFERENCE TO CO-PENDING APPLICATION

This application claims priority benefits from U.S. provisional patent application No. 60/156,369 entitled UNITIZED MODULARITY IN A PROCESS TRANSMITTER filed on Sep. 28, 1999, which is hereby incorporated by reference.

BACKGROUND OF THE INVENTION

The present invention relates to industrial processing plants. More particularly, the present invention relates to pressure transmitters used to measure pressure in such plants.

Pressure transmitters are typically assembled in a clean, controlled factory or workbench environment by fitting a pressure sensor module and a converter module together. Each of the two modules includes a housing with a threaded joint where electronic circuitry is exposed and accessible for connection to the other module. The two threaded joints are threaded together, and each module is sealed off by its connection to the other module to form the finished pressure transmitter and protect the internal electronic circuits.

Before the modules are joined, however, exposed electronic parts in the sensor modules can be damaged by handling, spilled or airborne corrosive chemicals, or weather conditions. These damaging conditions are often present in an installation location such as a chemical processing plant. Pressure transmitters are thus usually pre-assembled before they are brought into a process plant environment. This also means that the converter modules have to be completed before the sensor module is installed on the process piping. It has been found that in many instances it is desirable to install the pressure sensor module onto the process piping and pressurize the system before the plant is completed, and before the converter design is selected. Thus, a pressure sensor module that protects the electronic parts before a converter module is installed is desired.

SUMMARY OF THE INVENTION

A pressure sensor module comprises a hermetically sealed housing or external support structure that is integrally formed and surrounds and encloses a pressure sensor and a circuit for the sensor. The housing has a threaded process fluid inlet and a threaded sleeve adapted to support a converter module. The sleeve also supports a feedthrough that is adapted to couple electrical contacts to the converter module.

The isolator is adapted to receive process fluid and couples to the pressure sensor, forming a transducer in the pressure converter. The circuit in the pressure sensor module couples to the pressure sensor and provides a bus for energization, control, and a digital representation of pressure. The feedthrough has contacts or pins that couple to the lines of the bus, and has an insulator barrier wall surrounding the contacts.

The housing is preferably sealed to both the isolator and the feedthrough in a manner that prevents access to the pressure sensor and circuit using ordinary tools. The pressure sensor module can be safely handled, installed and remain in a process plant installation environment where it is subject to rough handling, chemical spills and vapors without having a converter installed thereon and without exposing electronic parts of the sensor module to the environment.

DETAILED DESCRIPTION OF THE ILLUSTRATED EMBODIMENTS

Figure 1:
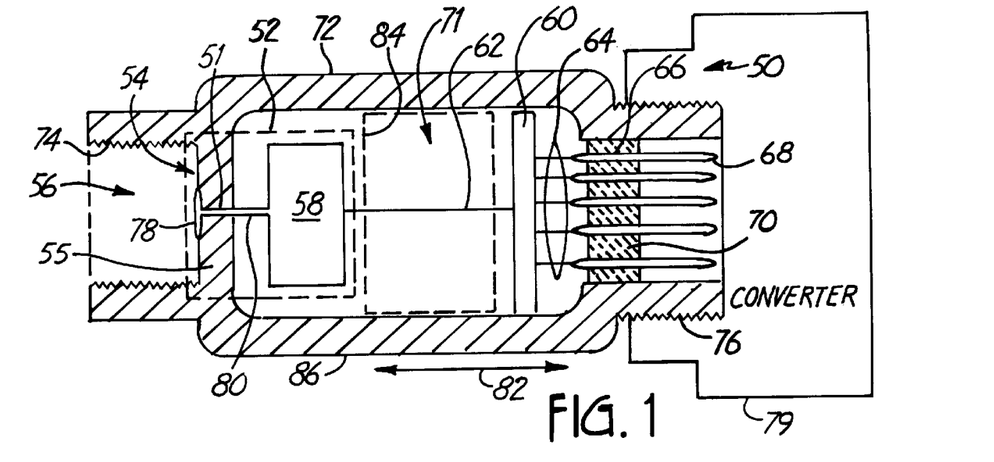
FIG. 1 shows a block diagram of a first embodiment of a pressure sensor module.

The improved pressure sensor module housing as shown in FIG. 1 has an integrally formed threaded process inlet and an integrally formed threaded sleeve or support shell for a feedthrough connector. The sleeve also mechanically supports a converter module. The housing hermetically seals and surrounds electronic components and a sensor in the pressure sensor module, so it can be installed alone in the field without a converter module and without exposing electronic parts of the pressure sensor module to the hazardous plant atmosphere. Process fluid piping can be connected to the improved pressure sensor module and pressure tested at an earlier stage in plant construction, even though the converter module is unavailable. The improved pressure sensor module can be left for extended periods of time during plant construction in an outdoor or plant environment without damage to the sensor or electronic components in the pressure sensor module. A converter module can then be selected and installed to complete assembly of the pressure transmitter during a later phase of plant construction.

FIG. 1 is a cross sectional view of a self contained, enclosed pressure sensor module 50 made according to the present invention. Module 50 comprises a hermetically sealed outer housing or hermetic external support structure 72 that has a sealed interior chamber 71 with a pressure isolator 54 closing one end. The isolator 54 comprises a wall 55 that is integral with and sealed relative to the outer wall of the housing 72. The isolator wall 55 has a small cross section passageway therethrough that is covered with an isolation diaphragm 78 that is sealed around its edges to the wall 55 and encloses an isolation fluid that transmits pressure acting on isolator diaphragm 78 along a passageway or tube 80 to a pressure sensor 58. The pressure sensor is mounted in sealed chamber 71. The pressure sensor 58 and isolator 54 comprise a transducer outlined in dotted lines 52. One end of the housing 72 has a process fluid inlet 56 that has an internally threaded bore 74 that connects to a process pressure line or fitting carrying a process fluid. Pressure at the inlet deflects diaphragm 78, which pressure is then sensed by pressure sensor 58.

The pressure sensor 58 is connected with a line 62 to provide pressure signals to a circuit 60 mounted in the chamber 71 adjacent an opposite end of the chamber. The end of the chamber 71 opposite from the inlet 56 has a cylindrical support sleeve or shell 76 with a bore that is sealingly closed with a sealing insulator wall 70, through which a plurality of electrical connector or contact pins 68 sealingly extend. The cylindrical sleeve 76 surrounds the pins 68 and a sealing insulator wall 70. The sealing wall 70 can be a thick glass seal that is formed in place to engage knurls or ridges on adjacent metal parts of the sleeve interior to form an explosion proof hermetic seal.

The threaded exterior of the sleeve 76 is adapted for receiving, holding and supporting a converter module shown schematically at 79, which contains electrical circuits such as a D/A converter that is connected through the connectors or pins 68 and a bus 64 to the circuit 60. The bus 64 has individual wires connected to respective pins 68.

The insulator sealing wall 70 that supports the pins 68 forms a feedthrough 66, for carrying electrical signals to and from circuit 60, such as those needed for energization, control and a digital representation of pressure. The circuit 60 preferably provides only a limited amount of energy to the pressure sensor 58, so that the pressure sensor 58 is intrinsically safe and will not ignite the process fluid in the event the isolator diaphragm 78 ruptures.

The external threads on sleeve 76 can be used to retain connectors rather than a converter module. The electrical converter module or a connector module mounted on the sleeve 76 would have mating contacts for electrically connecting to contacts or pins 68.

The module 50 is a pre-installable sealed enclosure for a sensor and circuit. The isolator wall 51 integrally sealed relative to the housing outer wall 86, and the sealing wall 70 hermetically seals the chamber 71, SO that the sensor 50, circuit 60, and other components in the chamber 71 are protected from harsh vapors and liquids. The electronic components forming circuit 60 are protected from handling damage as well.

The module 50 is made so that it cannot be opened using ordinary hand tools, and when preinstalled on process piping or fittings threaded into the threaded bore 74 of the inlet 56, it protects the sensor 58 and circuit 60 from harsh process environments, even with no converter module or connector attached to the sleeve 76. If desired, the sleeve 76 can be covered with a cover such as a CAPLUG cap or plug made by Protective Closures Co. of Buffalo, N.Y., to protect the outer ends of connector pins 68. The isolator 54, including the isolation diaphragm 78, will serve to seal off the process fluid line that is connected to the inlet 56 even without other components attached to the housing, so that the process lines and vessels can be pressurized and tested for leaks at an early phase in construction or refitting of a fluid processing plant. There is no need to wait until a complete control system is defined well enough to select a converter module for attachment to the pressure module 50 before testing for pressure.

The hermetically sealed housing or support structure 72 can be made of metal to provide the hermetically sealed chamber 71, and seams or joints can be welded so that the module 50 cannot be inadvertently opened.

The passageway or line 80 is preferably long and narrow enough to be flame proof or flame quenching as defined in current hazardous locations safety standards. The diaphragm 78 is a known isolation diaphragm and is coupled with the sensor 58 by incompressible fluid filling the flame proof passageway 80 and the region under the diaphragm. If the isolator fluid is lost, the passageway 80 maintains flame isolation between the process fluid and the interior cavity of the pressure sensor 58. The flame quenching passageway can be formed by electrical discharge machining (EDM) in the housing 72 or can be formed in a capillary tube.

The length of the housing 72, as indicated by the double arrow 82 can be selected so that the circuit 60 is spaced from the transducer module indicated by dotted lines 52, including the pressure sensor 58 and the isolator 54, to provide a thermally isolating space 84 that can be filled with an insulating material if desired. This will permit the circuit 60 to operate at a different ambient temperature from the sensor 58. Insulating materials can be air, dry nitrogen, fibrous or foamed insulating materials and other well known insulating materials. The housing 72 can have a substantially cylindrical cross section between the inlet 56 and the sleeve 76, with the term cylindrical referring to an external surface that is generated by a straight line segment moving parallel to a fixed straight line. This includes right circular cylindrical surfaces as well as general cylindrical surfaces. The cylindrical cross section will support the sleeve 76 and will transfer loads on the sleeve back to be supported on the threaded bore 74 of the inlet 56.

The threaded inlet 56 will be strong enough to support the mechanical load of the pressure sensor module 50 as well as a converter module 79 attached to and supported by sleeve 76.

Figure 2:
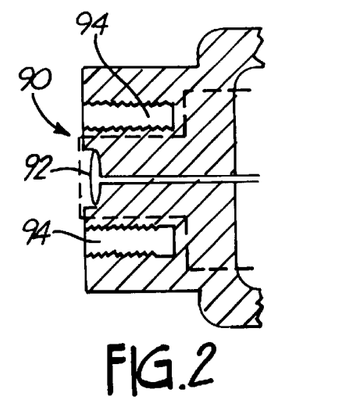
FIG. 2 shows a sectional view of a first embodiment of a threaded process fluid inlet.
Figure 3:
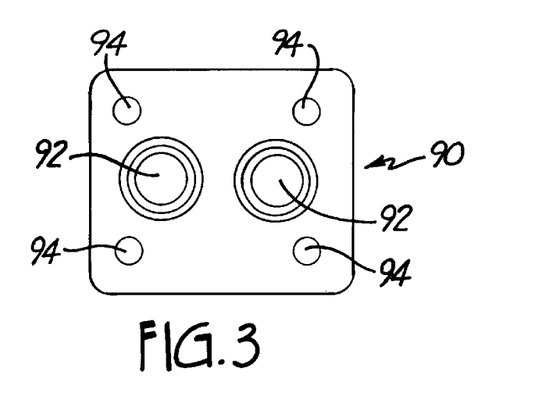
FIG. 3 shows an end view of the first embodiment of a threaded process fluid inlet.

In FIGS. 2 and 3, a modified isolator is shown and comprises a differential pressure inlet 90 that includes two isolator diaphragms 92 within a pattern of bolt holes 94. Inlet 90 couples to a coplanar process fluid flange that is mounted on the process piping. The process fluid flange can be the standard coplanar flange presently used with the Rosemount Model 3051 pressure transmitter, for example, or it can be a smaller size coplanar flange, depending on the size of isolator diaphragms 92. Pressure manifolds, drainvent valves, heat tracing, and the like can be included in a coplanar flange on the process piping, or included in the inlet 90, as desired. Dual inlet fittings that meet industry standards for sanitary applications are also contemplated. Threaded inlets that are secured using threaded nuts and threaded bolts to secure mating pressure flanges are also contemplated.

Figure 4:
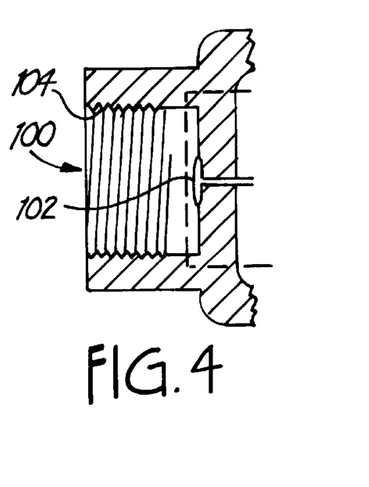
FIG. 4 shows a sectional view of a second embodiment of a threaded process fluid inlet.
Figure 5:
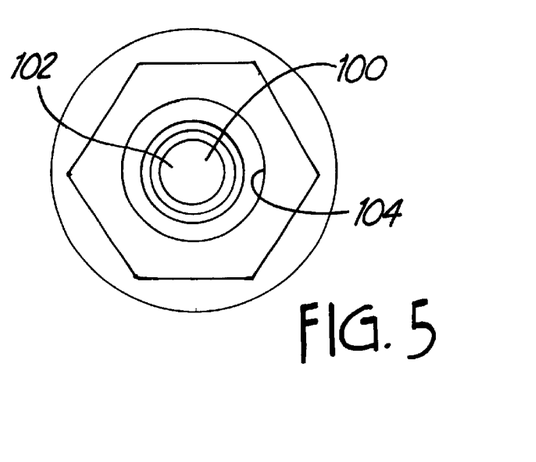
FIG. 5 shows an end view of the second embodiment of a threaded process fluid inlet.

In FIGS. 4 and 5, a single pressure inlet 100 is shown, and is used for sensing absolute pressure or gauge pressure. Inlet 100 includes one isolator diaphragm 102 surrounded by an internally threaded inlet fitting 104, which can be a standard sanitary fitting, if desired. Inlet 100 couples to a threaded pipe carrying process fluid, such as a standard pipe size presently used with the Rosemount Model 2088 pressure transmitter, for example, or it can be a smaller pipe size, depending on the size of isolators 102.

Figure 6:
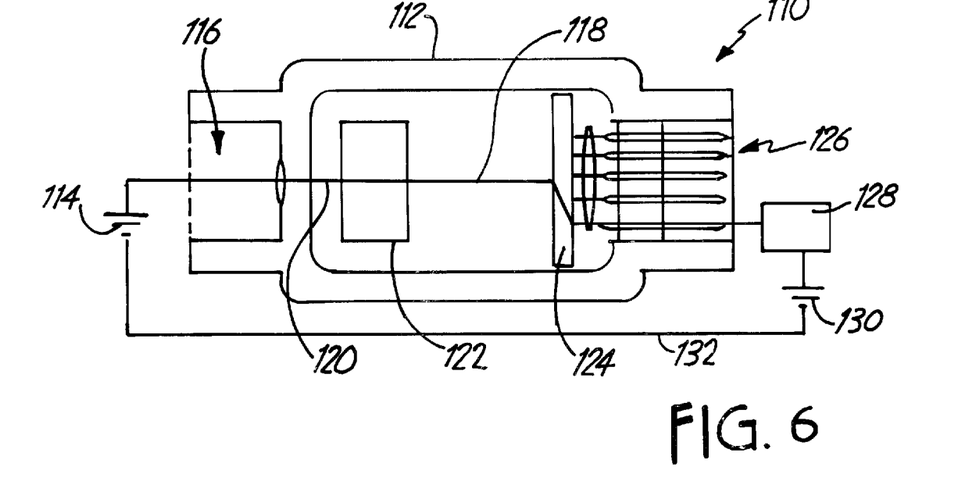
FIG. 6 shows a schematic of a ground loop in a pressure transmitter.

FIG. 6 is an electrical schematic diagram 110 of an electrically grounded pressure sensor module 112. The module 112 is connected to ground 114 at a process inlet 116. An electrical circuit path 118 is formed through isolator line 120, sensor 122, electrical circuit 124, and a pin in feedthrough 126. An external circuit 128 has a path to ground connection 130, which typically is at a power supply in a control room that is spaced many meters away from the module 112. The external circuit 128, which typically includes a converter module, a 4–20 mA circuit, a loop controller, or the like, plugs into feedthrough 126 such that there is a continuous electrical circuit path 118 through the module 112 that is grounded at both ends. The two ground connections 114 and 130 are physically separated and connect to one another along line 132 through the earth, metal process pipes and their supports, ground busses and the like. In ground systems such as this, stray voltage is present between the physically separated grounds. The line 118 and the line 132 together form a ground loop and DC and 60 Hz stray currents can flow along line 118, disturbing the operation of circuit 124 in the module 112.

Figure 7:
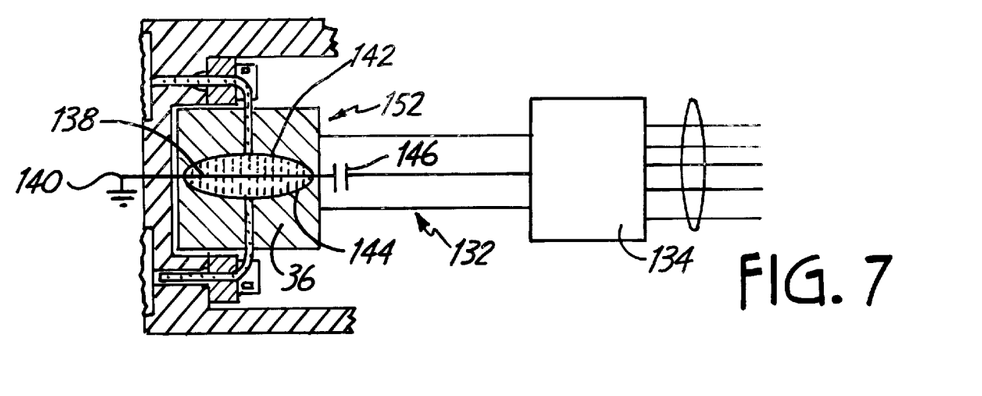
FIG. 7 shows an illustration and inset schematic of a first embodiment of an electrical barrier.

In FIG. 7, a module 132 is shown and it is arranged to substantially interrupt stray DC and 60 cycle AC currents from differing ground potentials. A dual plate capacitive pressure sensor 136 is coupled to a circuit 134 and has a central capacitor plate 138 that is grounded at ground 140 through process piping. Sensor 136 has a first galvanically isolated capacitor plate 142 and a second galvanically isolated capacitor plate 144. The capacitance between capacitor plates 142, 144 and grounded central capacitor plate 138 is so small in comparison to ground loop impedance that DC and 60 Hz stray currents are effectively blocked from flowing from ground 140 through the capacitor plates 142, 144 to the circuit 134. A small fixed capacitor 146 is connected in series between the grounded central plate 138 and the circuit 134 and is selected to be so small in comparison to the ground loop impedance that it effectively blocks DC and 60 Hz currents.

Figure 7A:
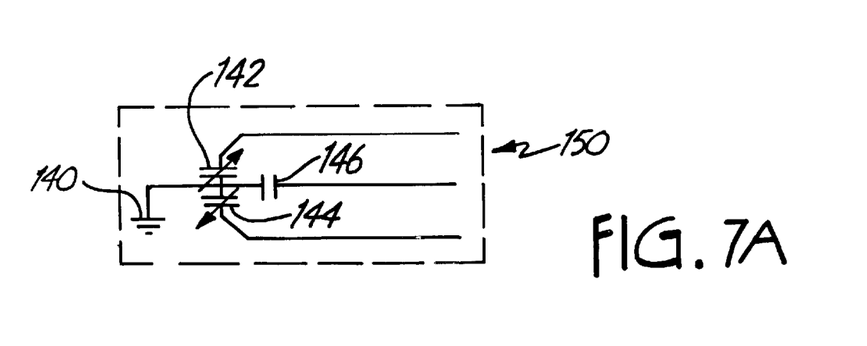
FIG. 7A shows a schematic circuit representation of an equivalent electrical barrier shown in FIG. 7.

The arrangement of the plates 142, 144, the fixed capacitor 146 and the central plate 138 are shown more clearly in FIG. 7A in a simplified schematic circuit diagram 150. The three small capacitances at plates 142 and 144 and fixed capacitor 146 comprise an electrical barrier. The barrier is indicated at 152 in FIG. 7 and interrupts flows of DC current between the external support housing or hermetic structure 72A and the bus. The barrier 152 is disposed along an electrical path through the circuit and transducer.

Figure 8:
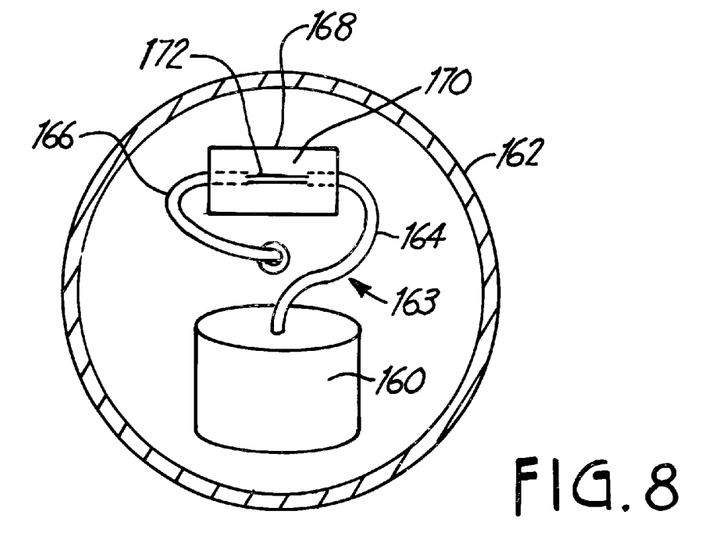
FIG. 8 shows an illustration of a second embodiment of an electrical barrier.

In FIG. 8, an alternative electrical barrier arrangement is shown. A sensor 160 is mounted in a hermetically sealed housing or hermetic external support structure 162. The isolator 163 includes a tube 164 connected to the sensor 160 and a tube 166 connected to an isolator chamber under an isolator diaphragm (not shown). The tube 166 is grounded to the isolator diaphragm and the process pressure inlet. An electrically insulating tube coupler forming an electrical barrier 168 is sealed to tubes 164, 166 with an insulating gap 170 between the tubes. Electrically insulating isolator fluid, such as silicone oil transfers pressure between the isolator diaphragm and the sensor 160 via a passageway 172 in the barrier 168.

Figure 9:
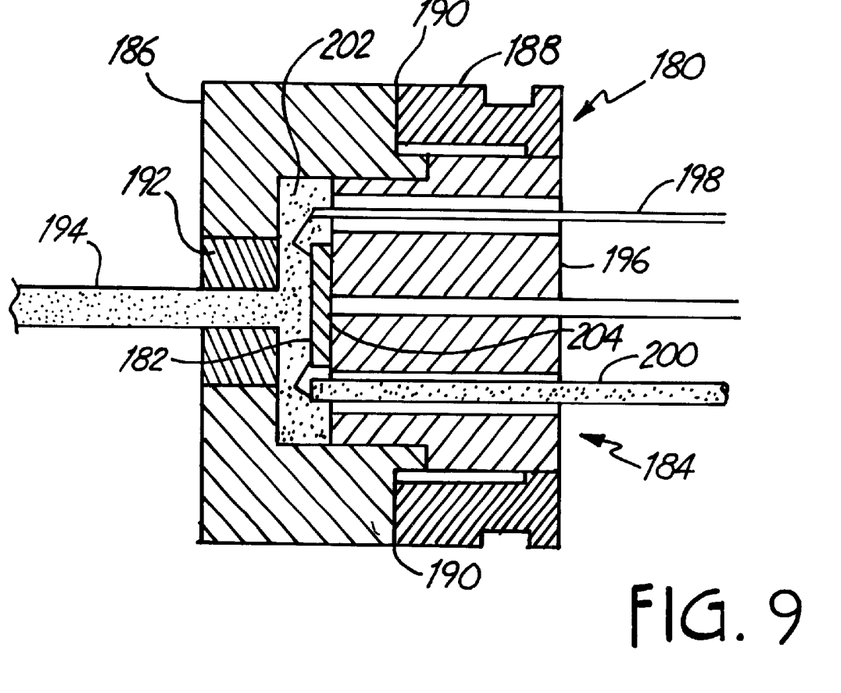
FIG. 9 shows a cross-sectional illustration of a third embodiment of an electrical barrier.

In FIG. 9, a sensor 180 has a sensing die 182, such as a capacitive or strain gauge sensing die, that is surrounded by a header 184. Header 184 includes a metal base 186 and a metal cap 188 that are welded together at 190. Metal base 186 surrounds an electrically insulating insert 192 that seals to an isolator tube 194 that, in turn, connects to an isolator chamber under an isolator diaphragm (nct shown). Metal cap 188 surrounds an electrically insulating mounting feedthrough 196 that includes multiple feedthrough electrical leads such as lead 198 and an oil fill seal off tube 200. Mounting feedthrough 196 has an insulated mounting surface 204 upon which the sensor die 182 is mounted. Header 184 is filled with isolator fluid such as silicone oil 202 and electrically insulates the grounded isolator tube 194 from the sensor 182 and its leads 198.

Electrical barriers that are formed in a circuit such as circuit 60 of FIG. 1 are also contemplated. These circuit type barriers can include a galvanic isolation circuit such as a transformer or optical isolator. The arrangement of such a circuit depends on the type of circuit selected to fit the application in module 110 of FIG. 6.

Figure 10:
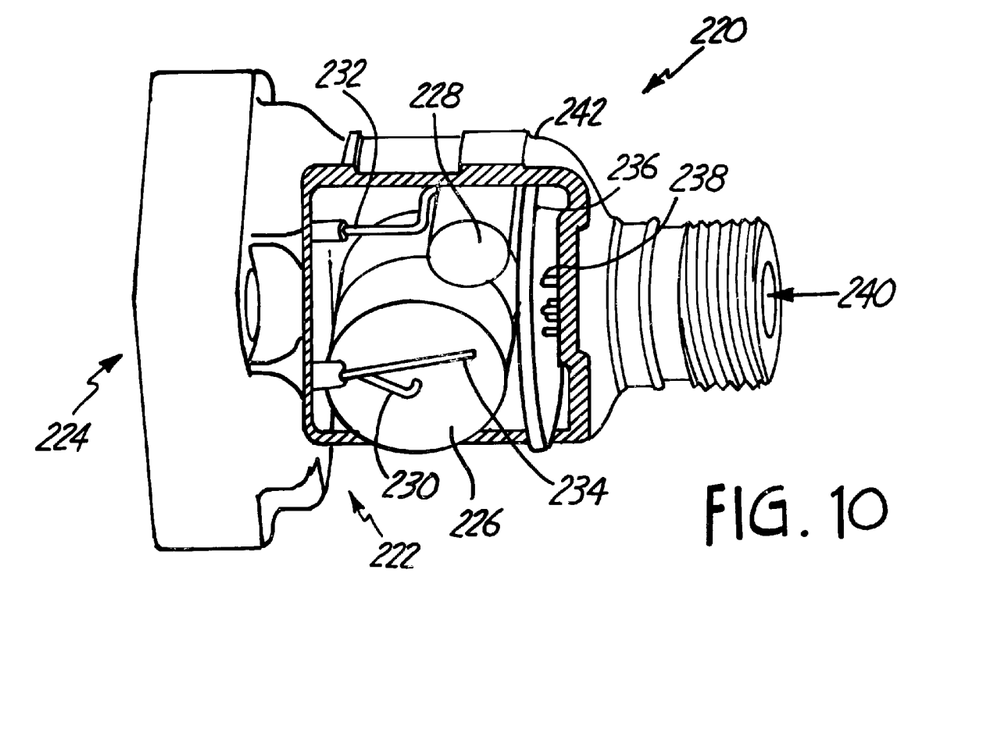
FIG. 10 shows a partially cutaway view of a second embodiment of a pressure sensor module.

In FIG. 10, an alternative embodiment of a differential pressure sensing module 220 is shown. A pressure transducer 222 includes isolator diaphragms 224 (hidden from view in FIG. 10, but arranged as shown in FIGS. 2 and 3), differential pressure sensor 226 and line pressure sensor 228. Tubes 230, 232 connect the isolator diaphragms 224 to the pressure sensors 226, 228 and are filled with incompressible fluid such as silicone oil. Two tubes 234 (one of which is illustrated) are used to fill the transducer 222 with the oil and seal it off after filling. A circuit 236 is placed on a round circuit board and has a bus 238 extending to a feedthrough 240 (hidden from view). A sealed housing or hermetic external support structure 242 is integrally formed by welding and seals the module 220 as explained in connection with embodiments described above.

Figure 11:
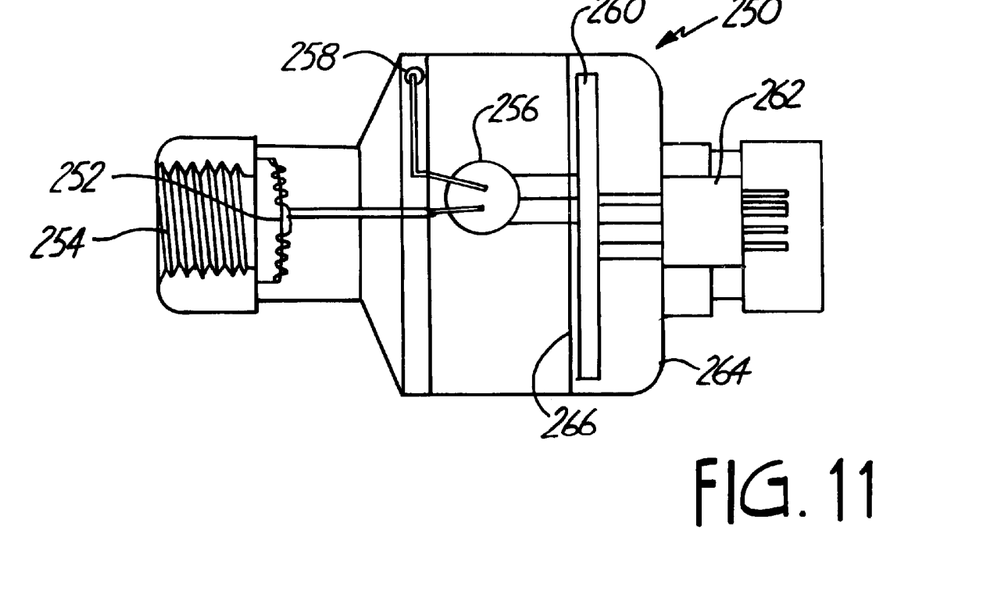
FIG. 11 shows a third embodiment of a pressure sensor module with a single process fluid inlet.

In FIG. 11, an alternative embodiment of a pressure sensor module is shown in outline or phantom view at 250. An isolator diaphragm 252 is arranged in a threaded process fluid inlet 254. A gauge pressure sensor 256 is arranged in a header as explained above. Gauge pressure sensor 256 has a vent for atmospheric pressure at 258. A circuit 260 and a feedthrough 262 are provided as explained in connection with other embodiments above. A housing or hermetic external support structure 264 is welded together along line 266 to seal the interior chamber.

The modules shown in FIGS. 10 and 11 are pre-installable as explained above.

Figure 12A:
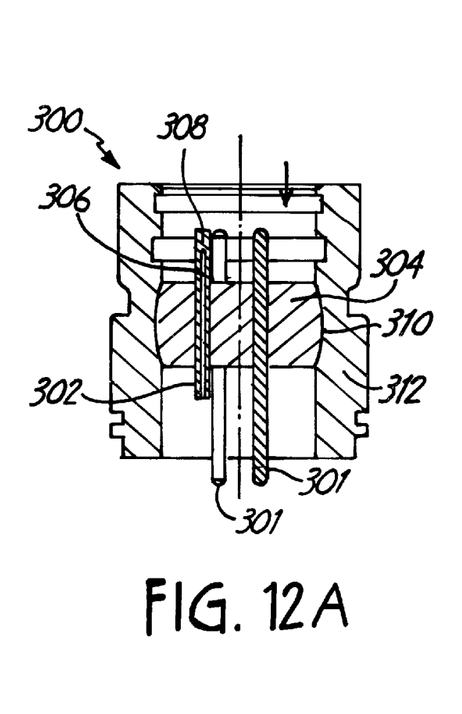
FIGS. 12A, 12B and 12C show a cross section, end, and side view, respectively, of an insulated feedthrough with a capillary tube passing through it.
Figure 12B:
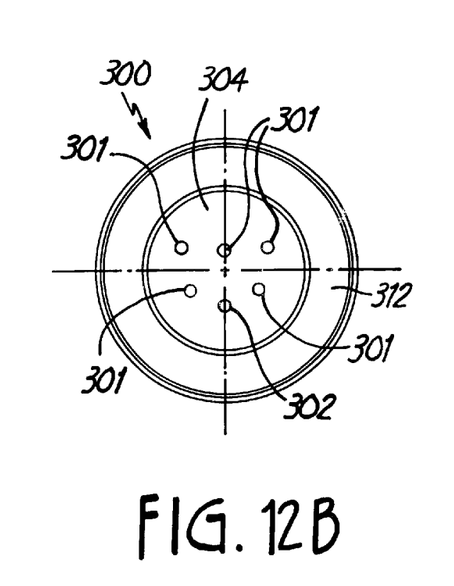
Figure 12C:
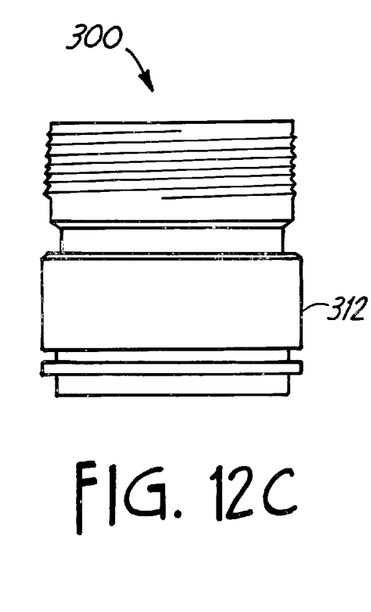

In FIGS. 12A, 12B and 12C, a feedthrough 300 for a pressure sensor module is shown that includes contacts 301 and a capillary tube 302 extending through a sealing insulator wall 304. The capillary tube 302 has an internal passageway 306 that is flame quenching, and also a seal 308 sealing off the internal passageway 306. The arrangement allows the flameproofing and hermetic sealing of the pressure sensor module to be tested during manufacture with the seal 308 is not yet in place. The seal 308 can then be placed on the capillary tube 302 without the need to test the seal 308 itself for flameproofing because the capillary itself is flameproof. The pressure sensor module is partially manufactured with the capillary tube open, in other words, without the seal. The capillary tube can then be connected to external equipment that pressurizes or depressurizes the internal cavity in the pressure sensor module to test for hermetic sealing or flameproofing. After the test, the seal is applied to the capillary, completing the manufacturing process.

The feedthrough 300 and the threaded support sleeve 312 have an overpressure strength in excess of the overpressure strength of the housing or hermetic external support structure, such as that shown at 72. The insulator 304 is secured in the threaded support sleeve 312 against overpressure by an annular irregularity 310 of the support sleeve 312 that engages the insulator 304. This arrangement ensures that overpressure does not force process fluid into the electrical conduits connected to the feedthrough 300.

The various embodiments all are part of a pressure sensor module having a hermetically sealed housing or hermetic external support structure that encloses and protects sensitive pressure sensor and electrical components from harsh environments and mechanical damage. The pressure sensor module can be installed as a separate stand alone unit and the internal components will remain protected for extended periods of time.

Although the present invention has been described with reference to preferred embodiments, workers skilled in the art will recognize that changes may be made in form and detail without departing from the spirit and scope of the invention.

What is claimed is:

1. A pressure sensor module, comprising:
   a transducer having an isolator within a threaded process fluid inlet, and having a pressure sensor coupled to the isolator; the isolator including an isolator diaphragm having a peripheral edge;
   a circuit coupled to the pressure sensor and providing a bus for energization, control, and a digital representation of pressure;
   a feedthrough comprising a module connector having contacts coupled to the bus, the contacts including contact portions exposed for electrical connection in the process environment and having an insulator surrounding the contacts; and
   a housing that is welded to the peripheral edge of the isolator diaphragm, sealed to the feedthrough, and that is integrally formed and surrounds the pressure sensor and the circuit, the housing protecting the transducer, and the circuit from inadvertent opening in the process environment, the housing including the threaded process fluid inlet, and a threaded sleeve supporting the feedthrough, the sleeve forming a module support.

2. The pressure sensor module of claim 1 wherein the housing is formed of metal and is explosion-proof.

3. The pressure sensor module of claim 1 wherein the housing is elongated along an axis extending from the transducer to the feedthrough, and the circuit is spaced apart from the transducer along the axis, and a quantity of thermally insulating material is disposed between the transducer and the circuit.

4. The pressure sensor module of claim 1 wherein the housing has a substantially cylindrical cross section between the threaded process fluid inlet and the threaded sleeve, the cylindrical cross section being adapted to support the sleeve, transferring external force exerted on the sleeve to the threaded process fluid inlet.

5. The pressure sensor module of claim 1 further comprising an electrical barrier interrupting flow of DC current between the housing and the bus, the barrier being disposed along a path through the circuit and transducer.

6. The pressure sensor module of claim 5 wherein the electrical barrier comprises at least one electrical capacitor in a line between the pressure sensor and the circuit.

7. The pressure sensor module of claim 6 wherein the electrical barrier comprises a header with an insulating mounting surface, and the pressure sensor is mounted on the insulating mounting surface.

8. The pressure sensor module of claim 6 wherein the electrical barrier comprises an electrically insulating tube coupler disposed between the isolator and the pressure sensor.

9. The pressure sensor module of claim 6 wherein the electrical barrier is disposed in the circuit and comprises a galvanic isolation circuit component selected from the group of isolation transformers and optical isolators.

10. The pressure sensor module of claim 1 wherein the feedthrough further comprises a capillary tube extending through the insulator, the capillary tube having an internal passageway that is flame quenching, and a seal sealing off the internal passageway.

11. The pressure sensor of claim 1 wherein the pressure sensor is coupled to the isolator by incompressible fluid in a flame quenching passageway, the passageway having an internal diameter that quenches flames.

12. The pressure sensor of claim 11 wherein the flame quenching passageway is formed by electrical discharge machining.

13. The pressure sensor of claim 11 wherein the flame quenching passageway is formed in a capillary tube.

14. The pressure sensor of claim 1 wherein the feedthrough and the threaded sleeve have an overpressure strength in excess of the overpressure strength of the housing.

15. The pressure sensor module of claim 14 wherein the insulator is secured in the sleeve against overpressure by an annular irregularity of the support sleeve that engages the insulator.

16. The pressure sensor module of claim 1 wherein the circuit couples a limited amount of energy to the pressure sensor such that the pressure sensor is intrinsically safe.

17. The pressure sensor module of claim 1 wherein the selected module comprises a converter module.

18. A pressure sensor module, comprising:
   a transducer having an isolator within a threaded process fluid inlet, and having a pressure sensor coupled to the isolator; the isolator including an isolator diaphragm having a peripheral edge;
   a circuit coupled to the pressure sensor and providing a bus for energization, control, and a digital representation of pressure;
   a feedthrough comprising a modular connector having contacts coupled to the bus, the contacts including contact portions exposed for electrical connection in the process environment; and having an insulator surrounding the contacts; and
   structure means joined to the feedthrough and the isolator for protecting the transducer and the circuit from inadvertent opening in the process environment.

19. The pressure sensor module of claim 1 wherein the housing does not have covers that, upon inadvertent opening, would expose the transducer and circuit to the process environment.

20. The pressure sensor module of claim 18 wherein the structure means does not have covers that, upon inadvertent opening, would expose the transducer and circuit to the process environment.

* * * * *